(12) United States Patent
Ito

(10) Patent No.: US 10,077,371 B2
(45) Date of Patent: Sep. 18, 2018

(54) INK SET AND RECORDING METHOD

(71) Applicant: Brother Kogyo Kabushiki Kaisha, Nagoya-shi, Aichi-ken (JP)

(72) Inventor: Shinpei Ito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/605,230

(22) Filed: May 25, 2017

(65) Prior Publication Data

US 2017/0342291 A1  Nov. 30, 2017

(30) Foreign Application Priority Data

May 30, 2016  (JP) .................................. 2016-107273

(51) Int. Cl.
| | | |
|---|---|---|
| C09D 11/324 | (2014.01) | |
| C09D 11/40 | (2014.01) | |
| B41J 2/01 | (2006.01) | |
| C09D 11/033 | (2014.01) | |
| C09D 11/107 | (2014.01) | |
| C09D 11/322 | (2014.01) | |

(52) U.S. Cl.
CPC ................. C09D 11/40 (2013.01); B41J 2/01 (2013.01); C09D 11/033 (2013.01); C09D 11/107 (2013.01); C09D 11/322 (2013.01)

(58) Field of Classification Search
None
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 8,016,404 B2 | 9/2011 | Kato et al. | |
| 8,426,496 B2 | 4/2013 | Yanagi et al. | |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2010/0227065 A1 | 9/2010 | Yanagi et al. | |

(Continued)

FOREIGN PATENT DOCUMENTS

| | | |
|---|---|---|
| JP | H08-003498 A | 1/1996 |
| JP | 2000-513396 A | 10/2000 |

(Continued)

*Primary Examiner* — Alejandro Valencia
(74) *Attorney, Agent, or Firm* — Banner & Witcoff, Ltd.

(57) ABSTRACT

An ink set includes: a first ink containing a first anion which is at least one selected from the group consisting of a nitrate ion, an acetate ion, an acrylic acid ion, a formic acid ion, and a methacrylic acid ion; and a second ink containing a second anion which is at least one selected from the group consisting of a sulfate ion, a phosphate ion, and an oxalate ion, wherein the first ink satisfies the following condition (A) and condition (B) and the second ink satisfies the following condition (C) and condition (D):

$X1 \geq 50$     Condition (A):

$X1/(X1+X2) > 0.6$     Condition (B):

X1: concentration of the first anion in the first ink (ppm)
X2: concentration of the second anion in the first ink (ppm)

$Y2 \geq 40$     Condition (C):

$Y1/(Y1+Y2) < 0.6$     Condition (D):

Y1: concentration of the first anion in the second ink (ppm)
Y2: concentration of the second anion in the second ink (ppm).

19 Claims, 2 Drawing Sheets

(56) References Cited

U.S. PATENT DOCUMENTS

| | | | |
|---|---|---|---|
| 2011/0086988 A1 | 4/2011 | Van Benthem et al. | |
| 2016/0075880 A1 | 3/2016 | Gu et al. | |

FOREIGN PATENT DOCUMENTS

| | | |
|---|---|---|
| JP | 2008-524400 A | 7/2008 |
| JP | 2008-246821 A | 10/2008 |
| JP | 2009-515007 A | 4/2009 |
| JP | 2010-168480 A | 8/2010 |
| JP | 2010-202765 A | 9/2010 |
| JP | 2011-515525 A | 5/2011 |

INK SET AND RECORDING METHOD

CROSS REFERENCE TO RELATED APPLICATION

The present application claims priority from Japanese Patent Application No. 2016-107273 filed on May 30, 2016, the disclosure of which is incorporated herein by reference in its entirety.

FIELD OF THE INVENTION

The present invention relates to an ink set and a recording method.

DESCRIPTION OF THE RELATED ART

In recording exemplified by ink-jet recording, the difference between a dot size of a primary color and a dot size of a secondary color is large in some cases, causing dot-size variation. In order to solve that problem, Japanese Patent Application Laid-open No. 2010-202765 corresponding to United States Patent Application Publication No. 2010/0227065 suggests an ink set including an ink composition that contains at least one of a water-soluble compound of which molecular weight is not more than 200 and the salt thereof and a treatment liquid that may form an aggregate by making contact with the ink composition, and an image forming method using the ink set.

SUMMARY

The ink set and the recording method, however, need a new approach improving dot-size uniformity.

An object of the present teaching is to provide an ink set that may improve dot-size uniformity and a recording method using the ink set.

According to a first aspect of the present teaching, there is provided an ink set including:

a first ink containing a first anion which is at least one selected from the group consisting of a nitrate ion, an acetate ion, an acrylic acid ion, a formic acid ion, and a methacrylic acid ion; and a second ink containing a second anion which is at least one selected from the group consisting of a sulfate ion, a phosphate ion, and an oxalate ion, wherein the first ink satisfies the following condition (A) and condition (B) and the second ink satisfies the following condition (C) and condition (D):

$X1 \geq 50$            Condition (A):

$X1/(X1+X2)>0.6$            Condition (B):

X1: concentration of the first anion in the first ink (ppm)
X2: concentration of the second anion in the first ink (ppm)

$Y2 \geq 40$            Condition(C):

$Y1/(Y1+Y2)<0.6$            Condition (D):

Y1: concentration of the first anion in the second ink (ppm)
Y2: concentration of the second anion in the second ink (ppm).

According to a second aspect of the present teaching, there is provided a recording method performing recording on a recording medium by use of an ink set including a first ink and a second ink, the method including:

forming a first recording portion on the recording medium by the first ink; and forming a second recording portion on the first recording portion by the second ink, wherein the first ink contains a first anion which is at least one selected from the group consisting of a nitrate ion, an acetate ion, an acrylic acid ion, a formic acid ion, and a methacrylic acid ion;

the second ink contains a second anion which is at least one selected from the group consisting of a sulfate ion, a phosphate ion, and an oxalate ion; and the first ink satisfies the following condition (A) and condition (B) and the second ink satisfies the following condition (C) and condition (D):

$X1 \geq 50$            Condition (A):

$X1/(X1+X2)>0.6$            Condition (B):

X1: concentration of the first anion in the first ink (ppm)
X2: concentration of the second anion in the first ink (ppm)

$Y2 \geq 40$            Condition(C):

$Y1/(Y1+Y2)<0.6$            Condition (D):

Y1: concentration of the first anion in the second ink (ppm)
Y2: concentration of the second anion in the second ink (ppm).

DESCRIPTION OF THE PREFERRED EMBODIMENTS

Figure 1A:
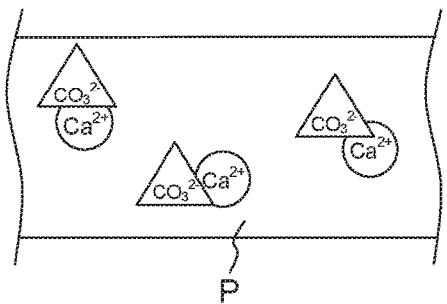
FIGS. 1A to 1F schematically illustrates an assumed mechanism about improvement of dot-size uniformity according to the present teaching.

An ink set of the present teaching will be explained. The ink set of the present teaching is not particularly limited, and it is preferably applicable, for example, to ink-jet recording. The ink set of the present teaching includes a first ink and a second ink. The first ink contains first anions. The second ink contains second anions. The first anions include at least one selected from the group consisting of nitrate ions, acetate ions, acrylic acid ions, formic acid ions, and methacrylic acid ions. The second anions include at least one selected from the group consisting of sulfate ions, phosphate ions, and oxalate ions. The first anions and the second anions may form salts thereof with the same kind of cations. The first anion is an ion that forms readily water-soluble salt with the cation as compared to the second anion. In other words, the second anion is an ion that forms poorly water-soluble salt with the cation as compared to the first anion. The "readily water-soluble" and "poorly water-soluble" are relative expressions of the relation between the salt formed by the first anion and the cation and the salt formed by the second anion and the cation. The first and second anions are ions that form salts thereof with the same kind of cations, as described above. The cations may be any cations contained in in a recording medium. The cations may be, for example, calcium ions ($Ca^{2+}$).

The solubility of each of the salts in water may be represented, for example, by the solubility at a temperature of 20° C. Specifically, the solubility of the salt in water may be represented by an amount (g) of the salt dissolving in 100 g of water at a temperature of 20° C. In TABLE 1, the calcium ion is an example of the cation, and TABLE 1 indicates solubility of the salt formed from the calcium ions and the first anions and solubility of the salt formed from the calcium ions and the second anions.

TABLE 1

|  | Molar mass | Solubility of calcium salt in water at 20° C. |
|---|---|---|
| Nitrate ion | 62.0 | 121.2 g/100 g |
| Acetate ion | 59.1 | 34.7 g/100 g |
| Acrylic acid ion | 72.1 | 25 g or more/100 g |
| Formic acid ion | 45.0 | 16.6 g/100 g |
| Methacrylic acid ion | 86.1 | 1 g or more/100 g |
| Sulfate ion | 96.1 | 0.24 g/100 g |
| Phosphate ion | 95.0 | 0.002 g/100 g |
| Oxalate ion | 88.0 | 0.00067 g/100 g |

Preferable specific examples of the solubility of the salt formed from the first anions and the solubility of the salt formed from the second anions are, for example, a combination of 1 g/100 g or more (the former) and less than 1 g/100 g (the latter), a combination of 5 g/100 g or more (the former) and less than 0.5 g/100 g (the latter), and a combination of 10 g/100 g or more (the former) and less than 0.1 g/100 g (the latter). As indicated in TABLE 1, the nitrate ions, acetate ions, acrylic acid ions, formic acid ions, and methacrylic acid ions form salts thereof with the calcium ions such that the solubility of salts in water at a temperature of 20° C. is 1 g/100 g or more. The sulfate ions, phosphate ions, and oxalate ions form salts thereof with calcium ions such that the solubility of salts in water at a temperature of 20° C. is less than 1 g/100 g.

<First Ink>

Subsequently, the first ink will be explained in detail. As described above, the first ink contains the first anions. Of the first anions and the second anions, the first ink may contain the first anions only or both the first anions and the second anions. As the first anions, one kind selected from the group consisting of nitrate ions, acetate ions, acrylic acid ions, formic acid ions, and methacrylic acid ions may be used singly, or two or more kinds of them may be used in combination. Similarly, as the second anions, one kind selected from the group consisting of sulfate ions, phosphate ions, and oxalate ions may be used singly, or two or more kinds of them may be used in combination. Derivation of the first anions and second anions is not particularly limited, and it may be, for example, one contained in a component (e.g., colorant) of the first ink or one intentionally added to the first ink.

The first ink satisfies the following condition (A) and condition (B). Even when the first ink contains no second anions (X2=0 ppm), X1/(X1+0)=1 is satisfied and the following condition (B) is satisfied.

$X1 \geq 50$ \hfill Condition (A):

$X1/(X1+X2)>0.6$ \hfill Condition (B):

X1: Concentration of the first anions in the first ink (ppm)
X2: Concentration of the second anions in the first ink (ppm)

The first ink preferably satisfies the following condition (B1). When the following condition (B1) is satisfied, it is possible to obtain an ink set having better dot-size uniformity.

$X1/(X1+X2)>0.65$ \hfill Condition (B1):

X1: Concentration of the first anions in the first ink (ppm)
X2: Concentration of the second anions in the first ink (ppm)

The first ink preferably satisfies the following condition (A1). When the following condition (A1) is satisfied, it is possible to obtain an ink set having better dot-size uniformity.

$X1 \geq 80$ \hfill Condition (A1):

X1: Concentration of the first anions in the first ink (ppm)

The upper value of the concentration (X1) of the first anions in the first ink is not particularly limited, which is, for example, not more than 1100 ppm. The concentration (X2) of the second anions in the first ink is not particularly limited, which is, for example, in a range of 25 to 100 ppm. As described above, the first ink may contain no second anions (X2=0 ppm, X1/(X1+0)=1). Namely, the first ink satisfies this condition $1 \geq X1/(X1+X2)$.

The first ink may further contain colorant. The colorant may be any of a pigment and a dye. The colorant may be one obtained by mixing a pigment and a dye. The pigment is exemplified, for example, by a resin-dispersible pigment and a self-dispersible pigment. In the present teaching, even when the first ink contains the resin-dispersible pigment that is likely to be mixed with anions as impurities, the dot-size uniformity may be improved.

The resin dispersible pigment is dispersible in water by, for example, a pigment dispersing resin (resin dispersant). The pigment that may be used as the resin dispersible pigment is not particularly limited and includes, for example, carbon black, an inorganic pigment, and an organic pigment. Those usable as the carbon black include, for example, furnace black, lamp black, acetylene black, and channel black. Those usable as the inorganic pigment include, for example, titanium oxide, iron oxide-based inorganic pigments, and carbon black-based inorganic pigments. Those usable as the organic pigment include, for example, azo-pigments such as azo lake, insoluble azo-pigment, condensed azo-pigment, and chelate azo-pigment; polycyclic pigments such as phthalocyanine pigment, perylene and perynon pigments, anthraquinone pigment, quinacridone pigment, dioxadine pigment, thioindigo pigment, isoindolinone pigment, and quinophthalone pigment; dye lake pigments such as basic dye type lake pigment and acid dye type lake pigment; nitro pigments; nitroso pigments; and aniline black daylight fluorescent pigment. The pigments are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and solid solutions of the above-listed pigments.

As the resin dispersant, for example, a general-purpose polymeric dispersant may be used, and the general-purpose polymeric dispersant may be a commercially available product. Examples of the commercially available product include "JOHNCRYL (trade name) 611", "JOHNCRYL (trade name) 60", "JOHNCRYL (trade name) 586", "JOHNCRYL (trade name) 687", "JOHNCRYL (trade name) 63", and "JOHNCRYL (trade name) HPD296" produced by BASF Corporation (the former Johnson Polymer L.L.C.); "Disperbyk 190" and "Disperbyk 191" produced by BYK additives & Instruments; and "SOLSPERSE 20000" and "SOLSPERSE 27000" produced by Zeneca.

The blending amount of the resin dispersant in the entire amount of the first ink is, for example, in a range of 0.01 to 10% by weight, in a range of 0.02 to 5% by weight, or in a range of 0.5 to 3% by weight.

The self-dispersible pigment is dispersible in water without using any dispersant, for example, owing to the fact that at least one of a hydrophilic functional group and the salt thereof including, for example, carbonyl group, hydroxyl group, carboxylic acid group, sulfonic acid group (sulfonate group), and phosphoric acid group (phosphate group) is introduced into the surfaces of pigment particles by the chemical bond directly or with any group intervening therebetween. It is possible to use self-dispersible pigments subjected to the surface treatment by any one of methods described, for example, in Japanese Patent Application Laidopen No. HEI8-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US 2006/0201380 A1), Published Japanese Translation of PCT International Publication for Patent Application No. 2009-515007 (corresponding to United States Patent Application Publication Nos. US 2007/0100023 A1, US 2007/0100024 A1, and US 2016/0075880 A1), and Published Japanese Translation of PCT International Publication for Patent Application No. 2011-515525 (corresponding to United States Patent Application Publication No. US 2011/0086988 A1). It is possible to use, as a material for the self-dispersible pigment, either one of the inorganic pigment and the organic pigment. Further, a pigment which is suitable for the above-described treatment includes, for example, carbon black such as "MA8", "MA100", and "#2650" produced by MITSUBISHI CHEMICAL CORPORATION and "Carbon Black FW200" produced by Degussa. The self-dispersible pigment may be, for example, a commercially available product. Examples of the commercially available product include "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Corporation; "BONJET (trade name) BLACK CW-2" and "BONJET (trade name) BLACK CW-3" produced by ORIENT CHEMICAL INDUSTRIES, LTD.; and "LIOJET (trade name) WD BLACK 002C" produced by TOYO INK MFG. CO., LTD.

The solid content blending amount of the pigment (pigment solid content amount) in the entire amount of the first ink is not particularly limited, and may be appropriately determined based on a desired optical density, chromaticness, and the like. The pigment solid content amount is, for example, in a range of 0.1 to 20% by weight, in a range of 1 to 15% by weight, or in a range of 2 to 10% by weight. Only one kind of the pigment as described above may be used singly, or two or more kinds of the pigments may be used in combination.

The dye is not particularly limited, which is exemplified, for example, by direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. The C. I. Direct Black is exemplified, for example, by C. I. Direct Blacks 17, 19, 32, 51, 71, 108, 146, 154, and 168. The C. I. Direct Blue is exemplified, for example, by C. I. Direct Blues 6, 22, 25, 71, 86, 90, 106, and 199. The C. I. Direct Red is exemplified, for example, by C. I. Direct Reds 1, 4, 17, 28, 83, and 227. The C. I. Direct Yellow is exemplified, for example, by C. I. Direct Yellows 12, 24, 26, 86, 98, 132, 142, and 173. The C. I. Direct Orange is exemplified, for example, by C. I. Direct Oranges 34, 39, 44, 46, and 60. The C. I. Direct Violet is exemplified, for example, by C. I. Direct Violets 47 and 48. The C. I. Direct Brown is exemplified, for example, by C. I. Direct Brown 109. The C. I. Direct Green is exemplified, for example, by C. I. Direct Green 59. The C. I. Acid Black is exemplified, for example, by C. I. Acid Blacks 2, 7, 24, 26, 31, 52, 63, 112, and 118. The C. I. Acid Blue is exemplified, for example, by C. I. Acid Blues 9, 22, 40, 59, 90, 93, 102, 104, 117, 120, 167, 229, and 234. The C. I. Acid Red is exemplified, for example, by C. I. Acid Reds 1, 6, 32, 37, 51, 52, 80, 85, 87, 92, 94, 115, 180, 256, 289, 315, and 317. The C. I. Acid Yellow is exemplified, for example, by C. I. Acid Yellows 11, 17, 23, 25, 29, 42, 61, and 71. The C. I. Acid Orange is exemplified, for example, by C. I. Acid Oranges 7 and 19. The C. I. Acid Violet is exemplified, for example, by C. I. Acid Violet 49. The C. I. Basic Black is exemplified, for example, by C. I. Basic Black 2. The C. I. Basic Blue is exemplified, for example, by C. I. Basic Blues 1, 3, 5, 7, 9, 24, 25, 26, 28, and 29. The C. I. Basic Red is exemplified, for example, by C. I. Basic Reds 1, 2, 9, 12, 13, 14, and 37. The C. I. Basic Violet is exemplified, for example, by C. I. Basic Violets 7, 14, and 27. The C. I. Food Black is exemplified, for example, by C. I. Food Blacks 1 and 2.

The blending amount of the dye in the entire amount of the first ink is not particularly limited, which is, for example, in a range of 0.1 to 20% by weight, in a range of 1 to 15% by weight, or in a range of 2 to 10% by weight. Only one kind of the dye as described above may be used singly, or two or more kinds of the dyes may be used in combination.

The first ink may further contain water. The water is preferably ion-exchanged water or pure water (purified water). The blending amount of the water in the entire amount of the first ink may be, for example, a balance of the other components.

The first ink may further contain a water-soluble organic solvent. The water-soluble organic solvent is exemplified, for example, by a humectant that prevents the ink from drying at an end of a nozzle in an ink-jet head and a penetrant that adjusts the drying velocity on the recording medium.

The humectant is not particularly limited, which is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above, the polyvalent alcohol such as alkylene glycol and glycerol is preferably used.

The blending amount of the humectant in the entire amount of the first ink is, for example, in a range of 0 to 95% by weight, in a range of 5 to 80% by weight, or in a range of 5 to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Only one kind of the penetrant as described above may be used singly, or two or more kinds of the penetrants may be used in combination.

The blending amount of the penetrant in the entire amount of the first ink is, for example, in a range of 0 to 20% by weight, in a range of 0 to 15% by weight, or in a range of 1 to 6% by weight.

The first ink may further contain a conventionally known additive, as necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol, cellulose, and water-soluble resin.

The first ink may be prepared, for example, by mixing the first anions and optionally other additive component(s) as necessary uniformly or homogeneously through any conventionally known method and then removing undissolved matters by a filter or the like.

<Second Ink>

Subsequently, the second ink will be explained. The second ink contains the second anions. Of the first anions and the second anions, the second ink may contain the second anions only or may contain both the first anions and the second anions. As the first anions, one kind selected from the group consisting of nitrate ions, acetate ions, acrylic acid ions, formic acid ions, and methacrylic acid ions may be used singly, or two or more kinds of them may be used in combination. Similarly, as the second anions, one kind selected from the group consisting of sulfate ions, phosphate ions, and oxalate ions may be used singly, or two or more kinds of them may be used in combination. The first anions and second anions may be, for example, those contained in a component (e.g., colorant) of the second ink or those intentionally added to the second ink.

The second ink satisfies the following condition (C) and condition (D). Even when the second ink contains no first anions (Y1=0 ppm), 0/(0+Y2)=0 is satisfied and the following condition (D) is satisfied.

$$Y2 \geq 40 \quad \text{Condition(C):}$$

$$Y1/(Y1+Y2) < 0.6 \quad \text{Condition (D):}$$

Y1: Concentration of the first anions in the second ink (ppm)

Y2: Concentration of the second anions in the second ink (ppm)

The second ink preferably satisfies the following condition (D1). When the following condition (D1) is satisfied, it is possible to obtain an ink set having better dot-size uniformity.

$$Y1/(Y1+Y2) \leq 0.55 \quad \text{Condition (D1):}$$

Y1: Concentration of the first anions in the second ink (ppm)

Y2: Concentration of the second anions in the second ink (ppm)

The second ink preferably satisfies the following condition (C1). When the following condition (C1) is satisfied, it is possible to obtain an ink set having better dot-size uniformity.

$$Y2 \geq 60 \quad \text{Condition (C1):}$$

Y2: Concentration of the second anions in the second ink (ppm)

The upper value of the concentration (Y2) of the second anions in the second ink is not particularly limited, which is, for example, not more than 600 ppm. The concentration (Y1) of the first anions in the second ink is not particularly limited, which is, for example, in a range of 40 to 150 ppm. As described above, the second ink may contain no first anions (Y1=0 ppm, 0/(0+Y2)=0). Namely, the second ink satisfies this condition $0 \leq Y1/(Y1+Y2)$.

The composition of the second ink other than the above and preparation method thereof are the same as those of the first ink.

Subsequently, a recording method of the present teaching will be explained. The recording method of the present teaching is a recording method of performing recording by use of the ink set of the present teaching, characterized by including a step of forming a first recording portion by use of the first ink and a step of forming a second recording portion on the first recording portion by use of the second ink.

The recording method of the present teaching is exemplified by an ink-jet recording method. The ink-jet recording method may be practiced, for example, by using an ink-jet recording apparatus which will be described later. The recording includes printing a letter (text), printing an image, printing, etc.

According to the present teaching, the dot-size uniformity may be improved by adjusting the concentrations of anions in the first ink and the second ink to meet predefined conditions. The mechanism improving the dot-size uniformity is assumed, for example, as follows. As depicted in FIG. 1D, a recording sheet P typically contains a large amount of calcium carbonate ($CaCO_3$) as loading material or the like. Namely, the recording sheet P as a recording medium contains cations (calcium ions). When a first recording portion Y is formed, as depicted in FIG. 1E, by an ink of which anion concentration is unadjusted and a second recording portion M is formed, as depicted in FIG. 1F, by another ink of which anion concentration is unadjusted on the first recording portion Y, the ink used for the first recording portion Y mixes with another ink used for the second recording portion M (blurring occurs). This may increase the dot size or diameter of another ink, reducing the dot-size uniformity. That is, the dot size of another ink obtained when the second recording portion M is formed therewith on the first recording portion Y (the dot size of a secondary color) is larger than the dot size of another ink obtained when a recording portion is formed only therewith on the recording sheet P (the dot size of a primary color). This makes the difference between the dot size of the primary color and the dot size of the secondary color large, deteriorating the dot-size uniformity.

Figure 1D:
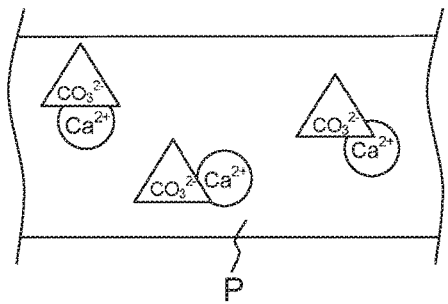
Figure 1B:
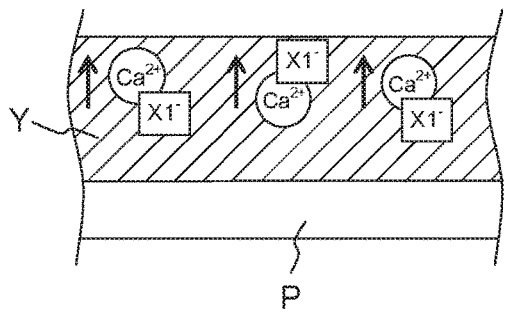
Figure 1E:
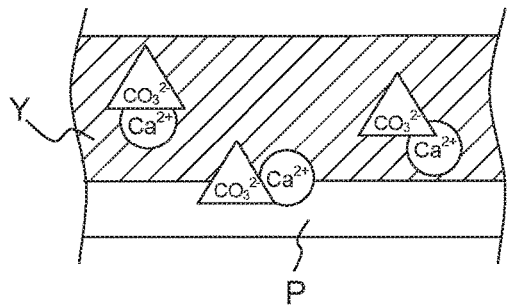
Figure 1C:
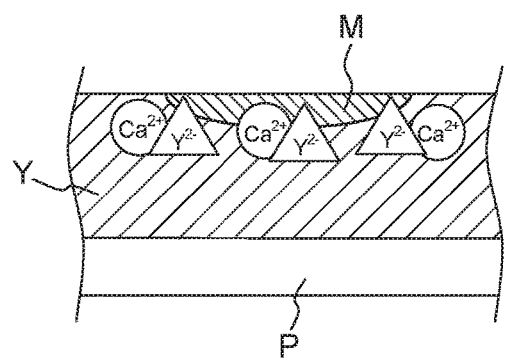
Figure 1F:
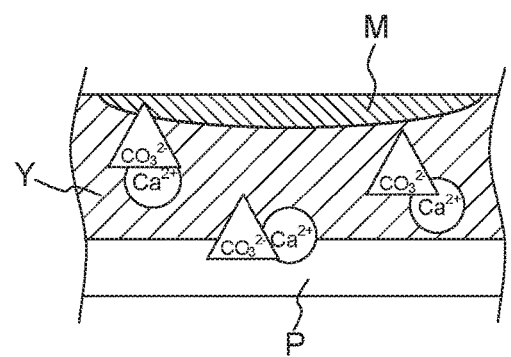

Meanwhile, when the first recording portion Y is formed, as depicted in FIG. 1B, by the first ink, in which concentration of the first anions $X1^-$ is adjusted, on the recording sheet P having a large amount of calcium carbonate depicted in FIG. 1A, the first anions $X1^-$ form the readily water-soluble salt with calcium ions. This causes the calcium ions to be eluted in the first ink, and the calcium ions move to a front surface side of the recording sheet P. After forming the first recording portion Y, when the second recording portion M is formed, as depicted in FIG. 1C, on the first recording portion Y by use of the second ink in which concentration of the second anions $Y2^-$ is adjusted, the calcium ions moving to the front surface side of the recording sheet P react with the second anions $Y2^-$. This forms the poorly water-soluble salt at the interface between the first ink and the second ink. Accordingly, the first ink and second ink are not likely to be mixed, the second ink (the secondary color) is prevented from increasing in dot size, and the dot-size uniformity is improved. Although FIGS. 1A to 1F is an example in which the cations are the calcium ions present in the recording sheet P, the dot-size uniformity may be improved by a similar mechanism, even when the cations are ions other than the calcium ions present in the recording medium. This mechanism, however, is just an assumption and the present teaching is not limited thereto. Further, in FIGS. 1B and 1C, the first anions and second anions are described as univalent anions, for convenience. The valences of the first anions and second anions are not limited, and may be bivalent or more.

In the present teaching, lightness (brightness or luminosity) of the first ink is preferably higher than lightness of the second ink. When the second recording portion is formed by the second ink having low lightness on the first recording portion formed by the first ink having high lightness, large dot size in the second recording portion is conspicuous. The present teaching prevents the second recording portion from having a conspicuous and large dot size so as to improve the dot-size uniformity. The lightness of the first ink may be lightness of the first ink itself or lightness of the recording portion (first recording portion) formed by the first ink. Similarly, the lightness of the second ink may be lightness of the second ink itself or lightness of the recording portion (second recording portion) formed by the second ink. The lightness of the first and second inks themselves may be measured, for example, by transmission by use of a commercially available spectral colorimeter or spectrophotometer. The lightness of the first and second recording portions may be measured, for example, by reflection by use of a commercially available spectral colorimeter or spectrophotometer. From a viewpoint of the lightness, for example, the first ink may be the yellow ink and the second ink may be the magenta ink.

In the present teaching, surface tension of the first ink is preferably lower than surface tension of the second ink. When the surface tension of the first ink is low, the first ink permeates a surface of the recording medium without staying thereon. This enhances the effect of dot-size uniformity. The surface tension may be measured, for example, by using a commercially available general-purpose measuring apparatus. The measurement temperature is, for example, room temperature (25° C.).

As described above, according to the present teaching, the dot-size uniformity may be improved by adjusting concentrations of anions in the first and second inks to meet predefined conditions.

Figure 2:
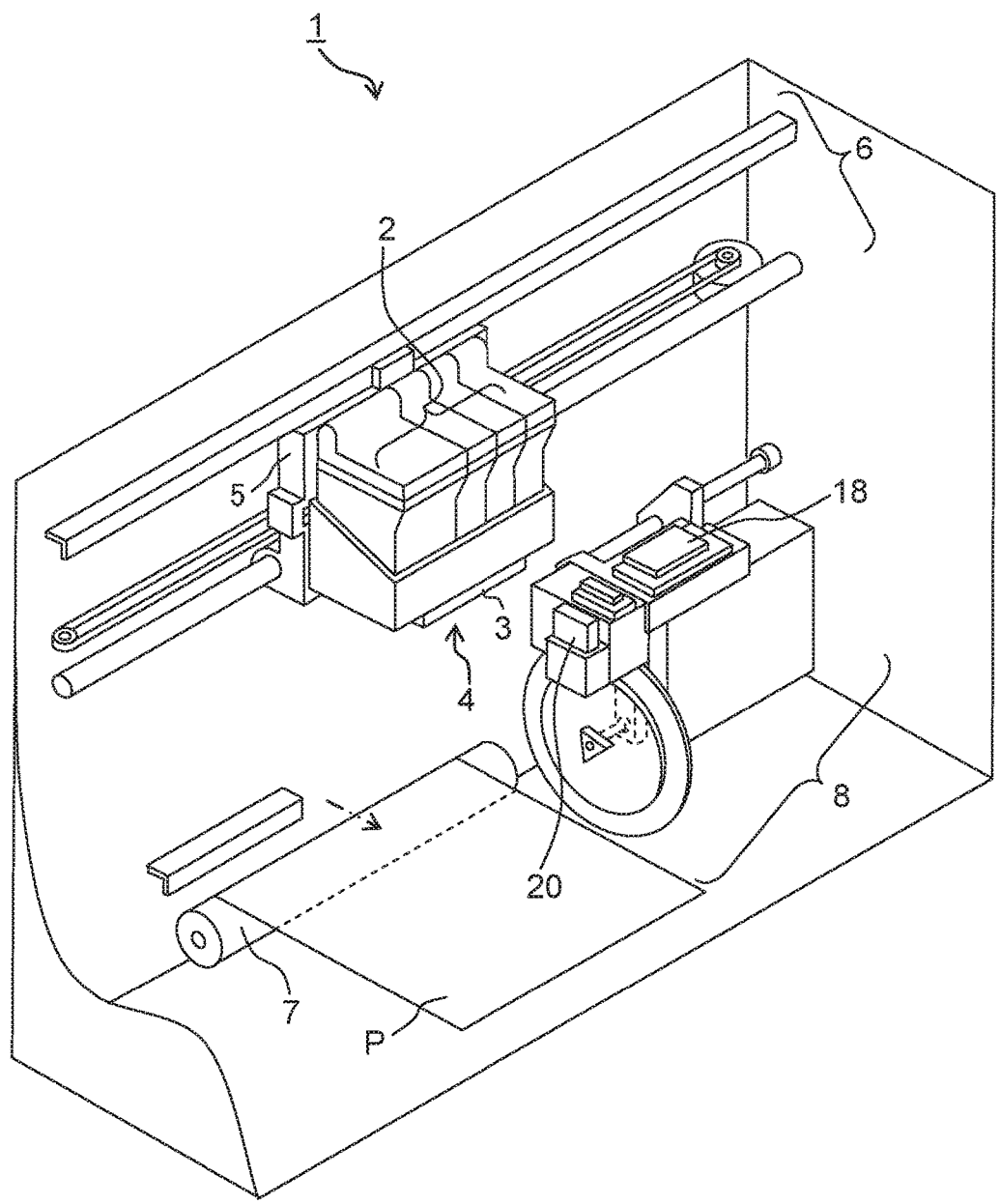
FIG. 2 is a schematic perspective view of an exemplary construction of an ink-jet recording apparatus that may be used for the present teaching.

FIG. 2 depicts an exemplary configuration of an ink-jet recording apparatus usable for the present teaching. As depicted in FIG. 2, an ink-jet recording apparatus 1 of the present teaching includes four ink cartridges 2, an ink-jet mechanism (ink-jet head) 3, a head unit 4, a carriage 5, a driving unit 6, a platen roller 7 and a purge device 8 as main constitutive components or parts.

Each of the four ink cartridges 2 contains the corresponding one of four water-based inks of yellow, magenta, cyan, and black. For example, the water-based yellow ink is the first ink of the present teaching and the water-based magenta ink is the second ink of the present teaching. Although this example uses a set with the four ink cartridges 2, instead of this, the present teaching may use an integrated type ink cartridge of which interior is comparted to form a water-based yellow ink accommodating section, a water-based magenta ink accommodating section, a water-based cyan ink accommodating section, and a water-based black ink accommodating section. As a body of the ink cartridge, for example, any conventionally known main body (body) of an ink cartridge may be used.

The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 2, a cap 18 is provided to cover a plurality of nozzles of the ink-jet head 3 which is returned to a reset position upon completion of recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 by use of tubes, etc., and the water-based inks are supplied from the four cartridges 2, respectively, to the head unit 4 via the tubes. Further, in these aspects, it is allowable to use four ink bottles having a bottle shape, instead of using the four ink cartridges 2. In such a case, each of the ink bottles is preferably provided with an inlet port via which the ink is poured from the outside to the inside of the ink bottle.

Ink-jet recording using the ink-jet recording apparatus 1 is performed, for example, in the following manner Namely, at first, the recording sheet P is supplied or fed from a paper feeding cassette or sheet feeding cassette (not depicted in the drawing) arranged at a side of or at a position below the ink-jet recording apparatus 1. The recording sheet P is introduced or guided between the ink-jet head 3 and the platen roller 7. Then, predefined recording is performed on the fed or introduced recording sheet P with the water-based ink(s) jetted from the ink-jet head 3. The recording sheet P after recording is discharged from the ink-jet recording apparatus 1. According to the present teaching, it is possible to obtain a recorded matter having good dot-size uniformity. In FIG. 2, illustration of the feed mechanism and discharge mechanism for the recording paper P is omitted.

In the apparatus depicted in FIG. 2, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited by and is not restricted to the examples and the comparative examples which will be described below.

[Preparation of Ink]

Purified water was added to 20% by weight of C.I. Pigment Yellow 74 or C.I. Pigment Red 122 and 5.0% by weight of a resin dispersant (acrylic acid-acrylic acid ester copolymer), so that the sum of them was 100% by weight, followed by being stirred (agitated) and mixed with each other. This mixture was put in a sand mill using zirconia beads with a diameter of 0.3 mm as a medium to perform dispersion treatment for six hours. After that, the zirconia beads were removed by a separator, and the mixture thus obtained was filtrated through a cellulose acetate filter (pore size 3.00 μm). Accordingly, the pigment dispersion liquids 1 and 2 indicated in TABLE 2 an TABLE 3 were each obtained.

Components, except for each pigment dispersion liquid, which were included in each ink composition (TABLE 2 or TABLE 3) as indicated below were mixed uniformly or homogeneously; and thus an ink solvent was obtained. Subsequently, the ink solvent was added to the pigment dispersion liquid, followed by being mixed uniformly. After that, the obtained mixture was filtrated through a cellulose acetate membrane filter (pore size 3.00 μm) produced by Toyo Roshi Kaisha, Ltd., and thus the first inks Y1 to Y15 as indicated in TABLE 2 and the second inks M1 to M13 as indicated in TABLE 3 were each obtained.

TABLE 2 (following)—LEGEND

TABLE 2

| | | First ink | | | | | | | | | | | | | | |
|---|---|---|---|---|---|---|---|---|---|---|---|---|---|---|---|---|
| | | Y1 | Y2 | Y3 | Y4 | Y5 | Y6 | Y7 | Y8 | Y9 | Y10 | Y11 | Y12 | Y13 | Y14 | Y15 |
| Ink composition | Pigment dispersion liquid 1 (*1) | | | | | | | | 4.00 | | | | | | | 4.00 |
| | Glycerol | | | | | | | | 17.00 | | | | | | | 17.00 |
| | Tripropylene glycol | | | | | | | | 4.00 | | | | | | | 4.00 |
| | Triethylene glycol-n-butyl ether | | | | | | | | 4.00 | | | | | | | 4.00 |
| | OLFIN (trade name) E1010 (*2) | | | | | | | | 1.00 | | | | | | | 0.70 |
| | SUNNOL (trade name) NL-1430 (*3) | | | | | | | | 0.10 | | | | | | | 0.10 |
| | Water | | | | | | | | balance | | | | | | | balance |
| Methacrylic acid ion (ppm) (*4) | | 50 | 80 | 100 | 200 | 1100 | 1000 | 80 | — | — | — | — | 40 | 70 | 60 | 200 |
| Acetate ion (ppm) (*5) | | — | — | — | — | — | — | — | 200 | — | — | — | — | — | — | — |
| Formic acid ion (ppm) (*6) | | — | — | — | — | — | — | — | — | 200 | — | — | — | — | — | — |
| Nitrate ion (ppm) (*7) | | — | — | — | — | — | — | — | — | — | 200 | — | — | — | — | — |
| Acrylic acid ion (ppm) (*8) | | — | — | — | — | — | — | — | — | — | — | 200 | — | — | — | — |
| Sulfate ion (ppm) (*9) | | 25 | 40 | 50 | 100 | 100 | 100 | 50 | 100 | 100 | 100 | 100 | 20 | 50 | 60 | 100 |

(*1): Dispersion liquid (containing resin dispersant) of C. I. Pigment Yellow 74, the numeral of this pigment dispersion liquid in the table indicates the pigment solid content amount.

(*2): Surfactant produced by Nissin Chemical Industry Co., Ltd.

(*3): Surfactant produced by Lion Specialty Chemicals, Co., Ltd., the numeral of this surfactant in the table indicates the active ingredient amount.

(*4): Intentionally added by use of potassium methacrylate (produced by Wako Pure Chemical Industries, Ltd.)

(*5): Intentionally added by use of sodium acetate (produced by KANTO CHEMICAL CO., INC.)

(*6): Intentionally added by use of sodium formate (produced by KANTO CHEMICAL CO., INC.)

(*7): Intentionally added by use of sodium nitrate (produced by KANTO CHEMICAL CO., INC.)

(*8): Intentionally added by use of barium acrylate (produced by Tokyo Chemical Industry Co., Ltd.)

(*9): Intentionally added by use of sodium sulfate (produced by KANTO CHEMICAL CO., INC.)

The unit of ink composition is % by weight

TABLE 3 (following)—LEGEND

TABLE 3

| | | Second ink | | | | | | | | | | | | |
|---|---|---|---|---|---|---|---|---|---|---|---|---|---|---|
| | | M1 | M2 | M3 | M4 | M5 | M6 | M7 | M8 | M9 | M10 | M11 | M12 | M13 |
| Ink composition | Pigment dispersion liquid 2 (*10) | | | | | | | 4.00 | | | | | | |
| | Glycerol | | | | | | | 17.00 | | | | | | |
| | Tripropylene glycol | | | | | | | 4.00 | | | | | | |
| | Triethylene glycol-n-butyl ether | | | | | | | 4.00 | | | | | | |
| | OLFIN (trade name) E1010 (*2) | | | | | | | 1.00 | | | | | | |
| | SUNNOL (trade name) NL-1430 (*3) | | | | | | | 0.10 | | | | | | |
| | Water | | | | | | | balance | | | | | | |
| Sulfate ion (ppm) (*9) | | 100 | 40 | 60 | 200 | 400 | 600 | 100 | 100 | — | — | 30 | 100 | 100 |
| Phosphate ion (ppm) (*11) | | — | — | — | — | — | — | — | — | 100 | — | — | — | — |
| Oxalate ion (ppm) (*12) | | — | — | — | — | — | — | — | — | — | 60 | — | — | — |
| Methacrylic acid ion (ppm) (*4) | | 80 | 40 | 60 | 100 | 100 | 100 | 120 | 150 | 80 | 40 | 30 | 170 | 200 |

(*10): Dispersion liquid (containing resin dispersant) of C. I. Pigment Red 122, the numeral of this pigment dispersion liquid in the table indicates the pigment solid content amount.
(*2): Surfactant produced by Nissin Chemical Industry Co., Ltd.
(*3): Surfactant produced by Lion Specialty Chemicals, Co., Ltd., the numeral of this surfactant in the table indicates the active ingredient amount.
(*9): Intentionally added by use of sodium sulfate (produced by KANTO CHEMICAL CO., INC.)
(*11): Intentionally added by use of dipotassium hydrogen phosphate (produced by Wako Pure Chemical Industries, Ltd.)
(*12): Intentionally added by use of sodium oxalate (produced by KANTO CHEMICAL CO., INC.)
(*4): Intentionally added by use of potassium methacrylate (produced by Wako Pure Chemical Industries, Ltd.)
The unit of ink composition is % by weight Examples 1 to 20 and Comparative Examples 1 to 6

<Ink Set Composition>

As indicated in TABLE 4, ink sets were configured by combining first inks and second inks.

<Evaluation of Ink Set>

Evaluation of dot-size uniformity was performed on the ink set of each of Examples 1 to 20 and Comparative Examples 1 to 6 in the following method. The surface tension of ink used in each of Examples 1 to 20 and Comparative Examples 1 to 6 was measured by using a measuring apparatus (product name: CBVP-Z, produced by Kyowa Interface Science Co., LTD). The measurement temperature was 25° C.

<Evaluation of Dot-Size Uniformity>

Ink cartridges of an ink-jet printer "DCP-J4225N" manufactured by BROTHER KOGYO KABUSHIKI KAISHA were filled with the first ink and second ink configuring the ink set of each of Examples 1 to 20 and Comparative Examples 1 to 6. A solid image as a first recording portion was recorded with the first ink on a plain paper ("HUMMERMILL ForeMulti-Purpose" produced by International Paper) and a dot image as a second recording portion was recorded with the second ink on the first recording portion immediately after recording of the first recording portion, thus obtaining each evaluation sample. Further, a dot image was recorded with only the second ink under the same recording condition, thus obtaining a reference sample. In each evaluation sample, measurement with a microscope was performed for 20 dots to measure the dot sizes of a secondary color of the second recording portion, and the average value thereof was determined as the dot size of the secondary color. Similarly, in the reference sample, measurement with a microscope was performed for 20 dots to measure the dot sizes of a primary color, and the average value thereof was determined as the dot size of the primary color. The percentage change in dot size was calculated by the following formula, and the dot-size uniformity was evaluated in accordance with the following evaluation criterion.

The percentage change in dot size (%) = $[(C2-C1)/C1] \times 100$

C2: Dot size of secondary color (μm)
C1: Dot size of primary color (μm)

<Evaluation Criterion for Dot-Size Uniformity Evaluation>

A: The percentage change in dot size was less than 4%
B: The percentage change in dot size was not less than 4% and less than 6%
C: The percentage change in dot size was 6% or more.

TABLE 4 indicates the ink set compositions and evaluation results of Examples 1 to 20 and Comparative Examples 1 to 6.

TABLE 4

| | Examples | | | | | |
|---|---|---|---|---|---|---|
| | 1 | 2 | 3 | 4 | 5 | 6 |
| First ink | Y1 | Y2 | Y3 | Y4 | Y3 | Y3 |
| First anion | Methacrylic acid | Methacrylic acid | Methacrylic acid | Methacrylic acid | Methacrylic acid | Methacrylic acid |
| X1 (ppm) | 50 | 80 | 100 | 200 | 100 | 100 |
| Second anion | Sulfuric acid | Sulfuric acid | Sulfuric acid | Sulfuric acid | Sulfuric acid | Sulfuric acid |
| X2 (ppm) | 25 | 40 | 50 | 100 | 50 | 50 |
| X1/(X1 + X2) | 0.67 | 0.67 | 0.67 | 0.67 | 0.67 | 0.67 |
| Surface tension (mN/m) | 31.0 | 31.4 | 31.2 | 31.4 | 31.2 | 31.2 |

TABLE 4-continued

| Second ink | M1 | M1 | M1 | M1 | M2 | M3 |
|---|---|---|---|---|---|---|
| Second anion Y2 (ppm) | Sulfuric acid 100 | Sulfuric acid 100 | Sulfuric acid 100 | Sulfuric acid 100 | Sulfuric acid 40 | Sulfuric acid 60 |
| First anion Y1 (ppm) | Methacrylic acid 80 | Methacrylic acid 80 | Methacrylic acid 80 | Methacrylic acid 80 | Methacrylic acid 40 | Methacrylic acid 60 |
| Y1/(Y1 + Y2) | 0.44 | 0.44 | 0.44 | 0.44 | 0.50 | 0.50 |
| Surface tension (mN/m) | 32.2 | 32.2 | 32.2 | 32.2 | 32.3 | 32.1 |
| Dot-size uniformity | B | A | A | A | B | A |
| Dot size of primary color (μm) | 107.2 | 107.6 | 107.8 | 108.2 | 109.7 | 108.2 |
| Dot size of secondary color (μm) | 112.9 | 111.6 | 111.2 | 111.4 | 116.1 | 112.0 |
| Percentage change in dot size (%) | 5.3 | 3.7 | 3.2 | 3.0 | 5.8 | 3.5 |

| | Examples | | | |
|---|---|---|---|---|
| | 7 | 8 | 9 | 10 |
| First ink | Y3 | Y3 | Y3 | Y5 |
| First anion X1 (ppm) | Methacrylic acid 100 | Methacrylic acid 100 | Methacrylic acid 100 | Methacrylic acid 1100 |
| Second anion X2 (ppm) | Sulfuric acid 50 | Sulfuric acid 50 | Sulfuric acid 50 | Sulfuric acid 100 |
| X1/(X1 + X2) | 0.67 | 0.67 | 0.67 | 0.92 |
| Surface tension (mN/m) | 31.2 | 31.2 | 31.2 | 30.9 |
| Second ink | M4 | M5 | M6 | M1 |
| Second anion Y2 (ppm) | Sulfuric acid 200 | Sulfuric acid 400 | Sulfuric acid 600 | Sulfuric acid 100 |
| First anion Y1 (ppm) | Methacrylic acid 100 | Methacrylic acid 100 | Methacrylic acid 100 | Methacrylic acid 80 |
| Y1/(Y1 + Y2) | 0.33 | 0.20 | 0.14 | 0.44 |
| Surface tension (mN/m) | 32.4 | 32.2 | 32.5 | 32.2 |
| Dot-size uniformity | A | A | A | A |
| Dot size of primary color (μm) | 107.1 | 106.7 | 107.2 | 107.2 |
| Dot size of secondary color (μm) | 110.8 | 109.2 | 109.2 | 110.3 |
| Percentage change in dot size (%) | 3.5 | 2.3 | 1.9 | 2.9 |

| | Examples | | | | | |
|---|---|---|---|---|---|---|
| | 11 | 12 | 13 | 14 | 15 | 16 |
| First ink | Y6 | Y7 | Y3 | Y3 | Y8 | Y9 |
| First anion X1 (ppm) | Methacrylic acid 1000 | Methacrylic acid 80 | Methacrylic acid 100 | Methacrylic acid 100 | Acetic acid 200 | Formic acid 200 |
| Second anion X2 (ppm) | Sulfuric acid 100 | Sulfuric acid 50 | Sulfuric acid 50 | Sulfuric acid 50 | Sulfuric acid 100 | Sulfuric acid 100 |
| X1/(X1 + X2) | 0.91 | 0.62 | 0.67 | 0.67 | 0.67 | 0.67 |
| Surface tension (mN/m) | 31.1 | 31.3 | 31.2 | 31.2 | 31.5 | 31.5 |
| Second ink | M1 | M1 | M7 | M8 | M1 | M9 |
| Second anion Y2 (ppm) | Sulfuric acid 100 | Sulfuric acid 100 | Sulfuric acid 100 | Sulfuric acid 100 | Sulfuric acid 100 | Phosphoric acid 100 |
| First anion Y1 (ppm) | Methacrylic acid 80 | Methacrylic acid 80 | Methacrylic acid 120 | Methacrylic acid 150 | Methacrylic acid 80 | Methacrylic acid 80 |
| Y1/(Y1 + Y2) | 0.44 | 0.44 | 0.55 | 0.60 | 0.44 | 0.44 |
| Surface tension (mN/m) | 32.2 | 32.2 | 32.4 | 32.5 | 32.2 | 32.1 |
| Dot-size uniformity | A | B | A | B | A | A |
| Dot size of primary color (μm) | 107.5 | 107.4 | 107.4 | 107.1 | 106.1 | 106.2 |
| Dot size of secondary color (μm) | 110.4 | 111.9 | 111.2 | 112.7 | 110.1 | 109.6 |

TABLE 4-continued

|  | | | | | | |
|---|---|---|---|---|---|---|
| Percentage change in dot size (%) | 2.7 | 4.2 | 3.5 | 5.2 | 3.8 | 3.2 |

| | Examples | | | |
|---|---|---|---|---|
| | 17 | 18 | 19 | 20 |
| First ink | Y10 | Y11 | Y4 | Y15 |
| First anion X1 (ppm) | Nitric acid 200 | Acrylic acid 200 | Methacrylic acid 200 | Methacrylic acid 200 |
| Second anion X2 (ppm) | Sulfuric acid 100 | Sulfuric acid 100 | Sulfuric acid 100 | Sulfuric acid 100 |
| X1/(X1 + X2) | 0.67 | 0.67 | 0.67 | 0.67 |
| Surface tension (mN/m) | 31.5 | 31.5 | 31.4 | 32.6 |
| Second ink | M1 | M1 | M10 | M1 |
| Second anion Y2 (ppm) | Sulfuric acid 100 | Sulfuric acid 100 | Oxalate acid 60 | Sulfuric acid 100 |
| First anion Y1 (ppm) | Methacrylic acid 80 | Methacrylic acid 80 | Methacrylic acid 40 | Methacrylic acid 80 |
| Y1/(Y1 + Y2) | 0.44 | 0.44 | 0.40 | 0.44 |
| Surface tension (mN/m) | 32.2 | 32.2 | 32.5 | 32.2 |
| Dot-size uniformity | A | A | A | A |
| Dot size of primary color (μm) | 106.7 | 107.1 | 105.9 | 108.8 |
| Dot size of secondary color (μm) | 110.2 | 110.4 | 109.8 | 112.8 |
| Percentage change in dot size (%) | 3.3 | 3.1 | 3.7 | 3.7 |

| | Comparative Examples | | | | | |
|---|---|---|---|---|---|---|
| | 1 | 2 | 3 | 4 | 5 | 6 |
| First ink | Y12 | Y3 | Y13 | Y14 | Y3 | Y3 |
| First anion X1 (ppm) | Methacrylic acid 40 | Methacrylic acid 100 | Methacrylic acid 70 | Methacrylic acid 60 | Methacrylic acid 100 | Methacrylic acid 100 |
| Second anion X2 (ppm) | Sulfuric acid 20 | Sulfuric acid 50 | Sulfuric acid 50 | Sulfuric acid 60 | Sulfuric acid 50 | Sulfuric acid 50 |
| X1/(X1 + X2) | 0.67 | 0.67 | 0.58 | 0.50 | 0.67 | 0.67 |
| Surface tension (mN/m) | 31.3 | 31.2 | 31.2 | 31.3 | 31.2 | 31.2 |
| Second ink | M1 | M11 | M1 | M1 | M12 | M13 |
| Second anion Y2 (ppm) | Sulfuric acid 100 | Sulfuric acid 30 | Sulfuric acid 100 | Sulfuric acid 100 | Sulfuric acid 100 | Sulfuric acid 100 |
| First anion Y1 (ppm) | Methacrylic acid 80 | Methacrylic acid 30 | Methacrylic acid 80 | Methacrylic acid 80 | Methacrylic acid 170 | Methacrylic acid 200 |
| Y1/(Y1 + Y2) | 0.44 | 0.50 | 0.44 | 0.44 | 0.63 | 0.67 |
| Surface tension (mN/m) | 32.2 | 32.5 | 32.2 | 32.2 | 32.2 | 32.0 |
| Dot-size uniformity | C | C | C | C | C | C |
| Dot size of primary color (μm) | 107.4 | 108.3 | 107.5 | 107.3 | 107.3 | 107.7 |
| Dot size of secondary color (μm) | 113.8 | 120.1 | 114.2 | 114.4 | 114.4 | 115.1 |
| Percentage change in dot size (%) | 6.0 | 10.9 | 6.2 | 6.6 | 6.6 | 6.9 |

As indicated in TABLE 4, each of Examples 1 to 20 had a good evaluation result of the dot-size uniformity.

Regarding Examples 1 to 4 in which X1/(X1+X2) was fixed to 0.67 and which were prepared under the same conditions except that concentrations (X1) of the first anions in the first ink were different from each other, each of Examples 2 to 4 satisfying X1≥80 had an evaluation result of dot-size uniformity better than the result of Example 1 satisfying X1=50.

Regarding Examples 5 and 6 in which Y1/(Y1+Y2) was fixed to 0.50 and which were prepared under the same conditions except that concentrations (Y2) of the second anions in the second ink were different from each other, Example 6 satisfying Y2=60 had an evaluation result of dot-size uniformity better than the result of Example 5 satisfying Y2=40. Each of Examples 7 to 9 satisfying Y2>60 had an evaluation result of dot-size uniformity better than the result of Example 5.

Regarding Examples 10 to 12 which satisfied $X1 \geq 80$ and were prepared under the same conditions except that the values obtained from $X1/(X1+X2)$ were different from each other, each of Examples 10 and 11 satisfying $X1/(X1+X2)>0.65$ had an evaluation result of dot-size uniformity better than the result of Example 12 satisfying $X1/(X1+X2)=0.62$.

Regarding Examples 13 and 14 which satisfied $Y2 \geq 60$ and were prepared under the same conditions except that the values obtained from $Y1/(Y1+Y2)$ were different from each other, Example 13 satisfying $Y1/(Y1+Y2)=0.55$ had an evaluation result of dot-size uniformity better than the result of Example 14 satisfying $Y1/(Y1+Y2)=0.60$.

Regarding Examples 4 and 20 which were prepared under the same conditions except that degrees of surface tension of the first ink were different from each other, Example 4 in which the surface tension of the first ink was lower than the surface tension of the second ink had the percentage change in dot size that is smaller than that of Example 20 in which the surface tension of the first ink was higher than the surface tension of the second ink, and the dot-size uniformity of Example 4 was superior to that of Example 20.

Regarding Comparative Example 1 which satisfied $X1=40$ and did not satisfy the condition (A), Comparative Example 2 which satisfied $Y2=30$ and did not satisfy the condition (C), Comparative Examples 3 and 4 which satisfied $X1/(X1+X2)<0.6$ and did not satisfy the condition (B), and Comparative Examples 5 and 6 which satisfied $Y1/(Y1+Y2)>0.6$ and did not satisfy the condition (D), the evaluations results of the dot-size uniformity were bad.

As described above, the ink set of the present teaching may improve the dot-size uniformity. The usage of the ink set of the present teaching is not particularly limited, and is widely applicable to a variety of kinds of recording.

What is claimed is:

1. An ink set comprising:
   a first ink containing a first anion which is at least one selected from the group consisting of a nitrate ion, an acetate ion, an acrylic acid ion, a formic acid ion, and a methacrylic acid ion; and
   a second ink containing a second anion which is at least one selected from the group consisting of a sulfate ion, a phosphate ion, and an oxalate ion,
   wherein the first ink satisfies the following condition (A) and condition (B) and the second ink satisfies the following condition (C) and condition (D):

$X1 \geq 50$          Condition (A):

$X1/(X1+X2)>0.6$          Condition (B):

X1: concentration of the first anion in the first ink (ppm)
   X2: concentration of the second anion in the first ink (ppm)

$Y2 \geq 40$          Condition (C):

$Y1/(Y1+Y2)<0.6$          Condition (D):

Y1: concentration of the first anion in the second ink (ppm)
   Y2: concentration of the second anion in the second ink (ppm).

2. The ink set according to claim 1, wherein the first ink satisfies the following condition (B1):

$X1/(X1+X2)>0.65$          Condition (B1):

X1: concentration of the first anion in the first ink (ppm)
   X2: concentration of the second anion in the first ink (ppm).

3. The ink set according to claim 1, wherein the second ink satisfies the following condition (D1):

$Y1/(Y1+Y2) \leq 0.55$          Condition (D1):

Y1: Concentration of the first anion in the second ink (ppm)
   Y2: Concentration of the second anion in the second ink (ppm).

4. The ink set according to claim 1, wherein the first ink satisfies the following condition (A1):

$X1 \geq 80$          Condition (A1):

X1: concentration of the first anion in the first ink (ppm).

5. The ink set according to claim 1, wherein the second ink satisfies the following condition (C1):

$Y2 \geq 60$          Condition (C1):

Y2: Concentration of the second anion in the second ink (ppm).

6. The ink set according to claim 1, wherein the first ink and the second ink each contain a pigment.

7. The ink set according to claim 6, wherein the pigment is a resin dispersible pigment.

8. The ink set according to claim 1, wherein lightness of the first ink is higher than lightness of the second ink.

9. The ink set according to claim 1, wherein surface tension of the first ink is lower than surface tension of the second ink.

10. The ink set according to claim 1, wherein the first anion and the second anion form salts thereof with the same kind of cation.

11. The ink set according to claim 10, wherein the cation is a calcium ion.

12. The ink set according to claim 1, wherein the first anion is a methacrylic acid ion.

13. The ink set according to claim 1, wherein the second anion is a sulfate ion.

14. The ink set according to claim 1, wherein the first ink is a yellow ink.

15. The ink set according to claim 1, wherein the second ink is a magenta ink.

16. The ink set according to claim 1, wherein the first ink contains both the first anion and the second anion, and
   the second ink contains both the first anion and the second anion.

17. A recording method performing recording on a recording medium by use of an ink set including a first ink and a second ink, the method comprising:
   forming a first recording portion on the recording medium by the first ink; and
   forming a second recording portion on the first recording portion by the second ink,
   wherein the first ink contains a first anion which is at least one selected from the group consisting of a nitrate ion, an acetate ion, an acrylic acid ion, a formic acid ion, and a methacrylic acid ion;
   the second ink contains a second anion which is at least one selected from the group consisting of a sulfate ion, a phosphate ion, and an oxalate ion; and
   the first ink satisfies the following condition (A) and condition (B) and the second ink satisfies the following condition (C) and condition (D):

$X1 \geq 50$          Condition (A):

$X1/(X1+X2)>0.6$          Condition (B):

X1: concentration of the first anion in the first ink (ppm)

X2: concentration of the second anion in the first ink (ppm)

$Y2 \geq 40$            Condition (C):

$Y1/(Y1+Y2) < 0.6$            Condition (D):

Y1: concentration of the first anion in the second ink (ppm)

Y2: concentration of the second anion in the second ink (ppm).

18. The method according to claim 17, wherein the recording medium contains a cation.

19. The method according to claim 18, the cation is a calcium ion.

\* \* \* \* \*